United States Patent
Luo et al.

(10) Patent No.: US 7,839,784 B2
(45) Date of Patent: Nov. 23, 2010

(54) VIRTUAL CIRCUIT CONNECTIVITY VERIFICATION INSERTION FOR PACKET LOSS CONTROL IN PSEUDOWIRE

(75) Inventors: Yuanqiu Luo, Cranbury, NJ (US); Si Yin, Kearny, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 175 days.

(21) Appl. No.: 12/178,132

(22) Filed: Jul. 23, 2008

(65) Prior Publication Data

US 2009/0046574 A1 Feb. 19, 2009

Related U.S. Application Data

(60) Provisional application No. 60/956,020, filed on Aug. 15, 2007.

(51) Int. Cl.
*H04L 12/26* (2006.01)
*H04L 12/56* (2006.01)
(52) U.S. Cl. .................. 370/232; 370/242; 370/395.52
(58) Field of Classification Search .................. None
See application file for complete search history.

(56) References Cited

U.S. PATENT DOCUMENTS

| | | | |
|---|---|---|---|
| 2006/0262772 A1* | 11/2006 | Guichard et al. | 370/351 |
| 2006/0285500 A1* | 12/2006 | Booth et al. | 370/250 |
| 2007/0206607 A1* | 9/2007 | Chapman et al. | 370/395.52 |
| 2008/0117819 A1* | 5/2008 | Flott et al. | 370/232 |

* cited by examiner

*Primary Examiner*—Ricky Ngo
*Assistant Examiner*—Clemence Han
(74) *Attorney, Agent, or Firm*—Joseph Kolodka

(57) ABSTRACT

A method includes inserting a virtual circuit connectivity verification packet into aggregated traffic of m packets transmitted over multiple pseudowires in a network path, replying to the transmitted m packets with a virtual circuit connectivity verification packet with a packet loss indication when at least one packet loss is detected in an m packet group, and adjusting a rate of transmitting the aggregated m packets responsive to the packet loss indication. In the preferred embodiment the multiple pseudowires are one of constant bit rate and variable bit rate and the adjusting of the rate includes rate adjustment of variable bit rate pseudowires.

8 Claims, 2 Drawing Sheets

VIRTUAL CIRCUIT CONNECTIVITY VERIFICATION INSERTION FOR PACKET LOSS CONTROL IN PSEUDOWIRE

This application claims the benefit of U.S. Provisional Application No. 60/956,020, entitled "VCCV Insertion for packet Loss Control in Pseudowire", filed on Aug. 15, 2007, the contents of which is incorporated by reference herein.

BACKGROUND OF THE INVENTION

Pseudowire (PW) technology emulates the legacy services over a packet switched network (PSN). The legacy services include Ethernet, Frame Relay, PPP, HDLC, ATM, low-rate TDM, SONET/SDH, and Fiber Channel, while PSN could be MPLS or IP (either IPv4 or IPv6). Legacy services have been providing voice and data connectivity to businesses, end users, as well as operators worldwide for years. T1 and E1 services have accounted for a substantial proportion of carrier revenue, and will continue to do so in the near future. The continued importance of the legacy services requires a technology to facilitate their integration with PSN, and PW is thus deemed as the evolutionary solution.

PW emulates the operation of traditional circuit connection by carrying the legacy services through a PSN. As shown by the block diagram 10 in FIG. 1, pseudowire PW creates a point-to-point link, providing a single TDM service which is perceived by its user as an unshared T1/E1 and T3/E3 circuit. In FIG. 1, the legacy service means a T1, E1, T3, or E3 signal, while the PSN could be based on IP or MPLS network. Besides TDM services illustrated in FIG. 1, PW is capable of supporting other native services, such as Frame Relay, ATM, SONET/SDH, as well as Fiber Channel. Because the PW emulation needs to satisfy the carried service operation, cost-performance trade-off is necessary to balance between circuit connection quality and packet switching capacity.

The IETF Pseudowire Emulation Edge to Edge (PWE3) working group was set up in 2001, focusing on the architecture for service provider edge-to-edge PW, and service-specific documents detailing the encapsulation techniques. The most important PW standards include IETF RFC 3985 ("Pseudo Wire Emulation Edge-to-Edge (PWE3) Architecture"), IETF RFC 4447 ("Pseudowire Setup and Maintenance Using the Label Distribution Protocol (LDP)"), IETF RFC 4448 ("Encapsulation Methods for Transport of Ethernet over MPLS Networks"), and IETF RFC 4553 ("Structure-Agnostic Time Division Multiplexing (TDM) over Packet"). Other standardization forums, including the ITU, are also active in producing standards and implementation agreements for PW.

Conventional networks support legacy services by employing specific Operation, Administration, and Maintenance (OAM) mechanisms. When network operators deploy the PW technology, seamless integration of these OAM mechanisms must be taken into account. One critical issue that must be addressed in PW is packet loss control. For example, in the conventional circuit switched network, TDM services are provided over dedicated channels with constant rates. Bit errors occur in the circuit switched network, while packet losses are usually negligible. On the other side, when packet switched network is employed for PW transmission, all PSNs suffer packet losses. Packet losses in PW occur when the input PW traffic requires more network resource than the PSN tunnel capacity. This is especially the case when the incoming PW traffic includes TDM PW as well as packet PW. The packet PW could carry non-congestion controlled traffic, such as MPEG-2 streams, which are bursty in nature. When the bursts of packet PW traffic overwhelm the PSN tunnel, packet losses are inevitable, thus degrading the PW circuit emulation quality. Another example is data synchronization. Native TDM data carry highly accurate timing information for clock recovery. When emulating TDM over PW, inevitable packet losses result in timing information losses, and therefore, the inability to reproduce the TDM timing. To this end, packet loss detection and control mechanisms for the PSN portion are pivotal to the success of PW.

The Virtual Circuit Connectivity Verification (VCCV) mechanism was recently proposed to facilitate OAM in PW. It defines a set of messages which are inserted into PW data stream to enable management functionalities, such as connectivity and verification. Each VCCV packet contains the information of its sequence number as well as the current value of the transmission counter for PW packets. When the PW receiver receives a VCCV packet, it records the transmission counter contained in the VCCV packet. Each PW receiver also has a local received counter, which counts the received PW packets. The PW receiver compares the value of the transmission counter with that of the received counter. Packet losses are detected when the count of the transmitted packets is greater than that of the received packets. VCCV provides the aforementioned mechanism to detect packet losses, while the issues such as packet loss control and compensation are open to and challenging the PW community.

Accordingly, there is need for a packet loss control mechanism in pseudowire emulation by employing the VCCV messages.

SUMMARY OF THE INVENTION

In accordance with the invention, a method includes inserting a virtual circuit connectivity verification packet into aggregated traffic of m packets transmitted over multiple pseudowires in a network path, replying to the transmitted m packets with a virtual circuit connectivity verification packet with a packet loss indication when at least one packet loss is detected in an m packet group, and adjusting a rate of transmitting the aggregated m packets responsive to the packet loss indication. In the preferred embodiment the multiple pseudowires are one of constant bit rate and variable bit rate and the adjusting of the rate includes rate adjustment of variable bit rate pseudowires.

In another aspect of the invention, a method for includes inserting by a sending node over a network path a virtual circuit connectivity verification packet into aggregated traffic of a number of packets over multiple pseudowires being one of a constant bit rate and a variable bit rate, replying to the sending node with a virtual circuit connectivity verification packet with a packet loss indication from a receiving node when at least one packet loss is detected in the number of packets; and adjusting a rate of a rate of the variable bit rate pseudowires responsive to the packet loss indication received by the sending node. Adjusting the rate includes rate adjustment of the variable bit rate pseudowires until consecutive virtual circuit connectivity verifications without a packet loss indication occur.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to a packet loss control process to emulate the delivery of native services over packet switched network (PSN) using pseudowire (PW) technology. Virtual Circuit Connectivity Verification (VCCV) messages are employed at the PW provider edge nodes for synchronization as well as packet loss control. A VCCV insertion (VI) process is used for adapting variable bit rate (VBR) PW rates to the dynamics of PSN tunnel performance. Particularly, the rate adjustment process employed at the provider edge nodes adapts PW data transmission. This inventive technique classifies the PW traffic into two categories, constant bit rate (CBR) and variable bit rate (VBR), and manages their data delivery accordingly. It targets reduction of packet losses in PW by tuning the VBR traffic delivery dynamically.

Packet Loss Control (PLC)

Figure 1:
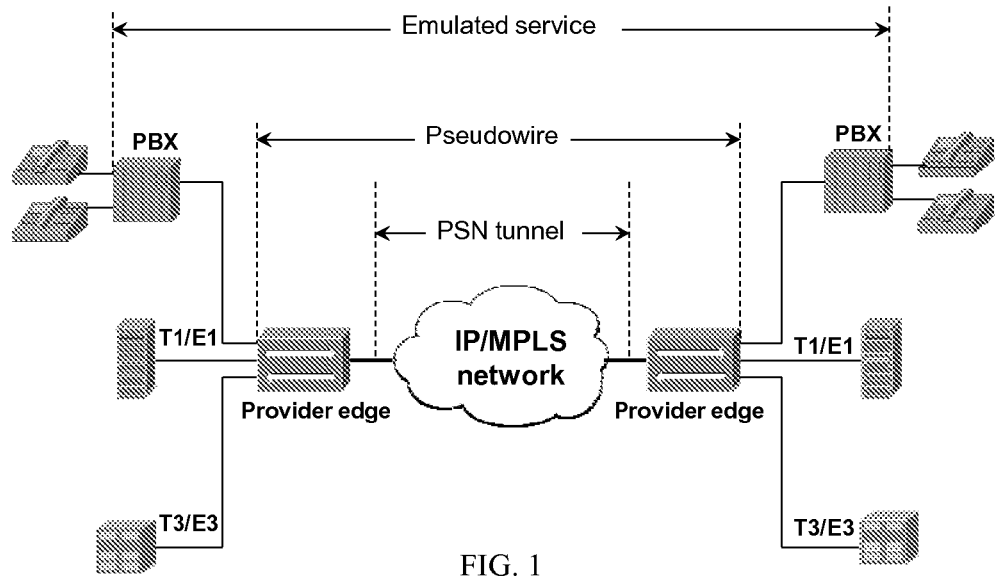
FIG. 1 is a diagram of an exemplary pseudowire emulation of legacy services over a packet switched network (PSN).
Figure 2:
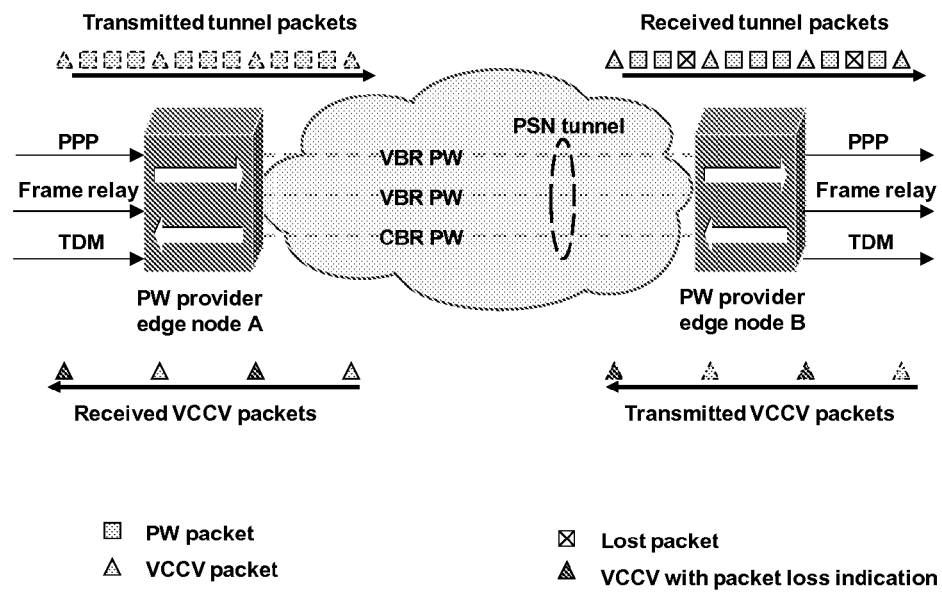
FIG. 2 is a diagram illustrating an exemplary use of virtual circuit connectivity verification (VCCV) messages at pseudowire PW provider edge nodes for synchronization as well as packet loss control in accordance with the invention.

As shown by the block diagram 20 in FIG. 2, the PW provider edge node classifies the incoming PWs into two categories, constant bit rate pseudowire CBR PW, which carries data with strict requirement on transmission rate and time synchronization, and variable bit rate pseudowire VBR PW, which has relatively loose requirements on rate and timing. A PSN tunnel is set up between two PW provider edge nodes, containing all of the PWs between the two nodes. Sending node A inserts VCCV packets into the PSN tunnel. As exemplified in FIG. 2, one VCCV packet is inserted after three data packets. At receiving node B, packet losses are detected by checking the VCCV packets as introduced in Section 2. In the reverse tunnel from B to A, VCCV packets are sent to verify the forward transmission from A to B. When packet loss occurs, node B marks the replied VCCV with a "packet loss" indication.

Assume multiple PWs are established within one PSN tunnel and the network resource allocated to this tunnel is fixed. The packet loss control PLC is implemented via the following three phases:

Phase 1: All PWs in the tunnel are put into two categories: CBR PWs and VBR PWs. The sending node inserts one VCCV packet into the aggregated tunnel traffic by every m packets.

Phase 2: After receiving m packets, the receiving node replies a VCCV packet to the sending node. When one or more than one packet loss is detected in an m packet group, a VCCV packet with "packet loss" indication is replied.

Phase 3: When a VCCV packet is received by the sending node, the flowchart 30 of FIG. 3 is employed for rate adjustment.

VCCV Insertion (VI)

Figure 3:
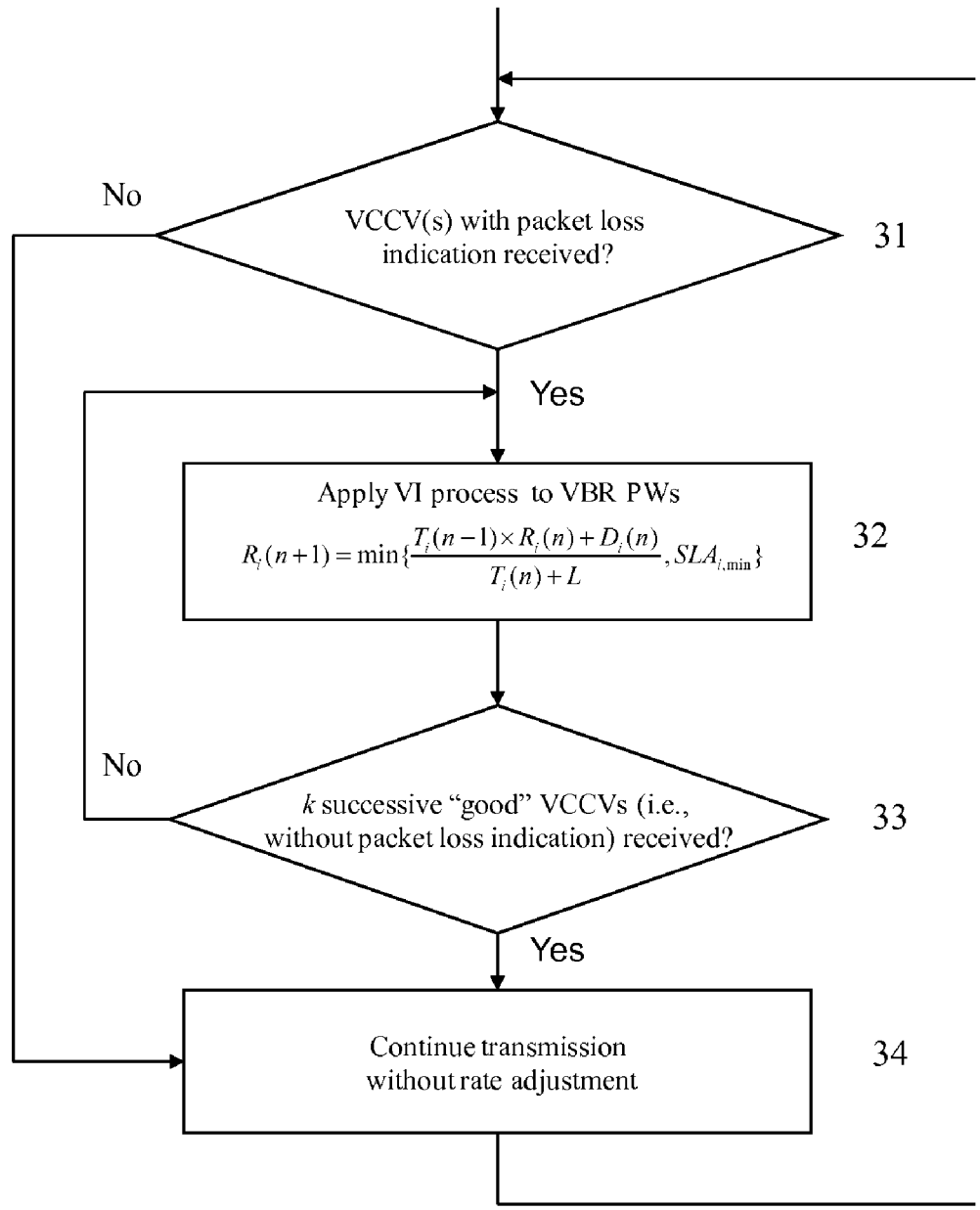
FIG. 3 is a diagram of a virtual circuit connectivity verification (VCCV) insertion process for adapting variable bit rate (VBR) pseudowire PW rates to the dynamics of PSN tunnel performance

As shown by the flow diagram 30 in FIG. 3, the VI process is employed whenever packet loss 31 occurs in the PSN tunnel. The sending edge node keeps tuning the rates of VBR PWs until k consecutive VCCV without "packet loss" indication are received 32, 33, 34. Following notations are adopted by the VI algorithm:

$T_i(n)$: Round trip time (RTT) of VBR PW i in interval n;
$R_i(n)$: Rate of VBR PW i in interval n;
$D_i(n)$: Successfully received packets of VBR PW i in interval n;
L: VCCV insertion interval.

VI is employed at the sending edge node to throttle the VBR PW rate 32 as $$R_i(n+1) = \frac{T_i(n-1) \times R_i(n) + D_i(n)}{T_i(n) + L}. \quad (1)$$

When the PSN tunnel performance changes, PW circuit emulation falls into one of three scenarios. First, in the reverse tunnel, when the VCCV packets change from "no packet loss" indication to "packet loss" indication, packet loss occurs on the forward tunnel. In this scenario, RTT increases because of the overwhelmed traffic in the tunnel, and $T_i(n-1) \ll T_i(n)$. As compared to Eq. (1), RTT $T_i(n)$ increases, in the meanwhile, $D_i(n)$ may reduce for packet losses in VBR PW i. Therefore, the rate of VBR PW i is adjusted as $R_i(n+1) < R_i(n)$.

In the second scenario, the sending edge node keeps receiving VCCV packets with "packet loss" indication 31, and VBR PW continues updating its rate based on Eq. (1). VBR PW enters the tuning stage, where its rate varies depending on the changes of instantaneous RTT and successively received packets.

In the third scenario, packet loss has been eliminated by the rate reduction of VBR PWs, the PSN tunnel performance becomes better with the indication of a shorter RTT and no packet loss 34. In this scenario, we have $T_i(n-1) \ll T_i(n)$. As compared to Eq. (1), RTT $T_i(n)$ decreases, and $D_i(n)$ may increase for packet loss elimination in VBR PW i. The rate of VBR PW i is thus adjusted as $R_i(n+1) > R_i(n)$.

We have proposed a mechanism to address the issue of packet loss control in PW. It employs VCCV packets for PSN tunnel performance monitoring. The proposed VI algorithm throttles VBR PW rates when packet losses occur in the PW circuit emulation.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method comprising the steps of:
    inserting by a sending node of a network a virtual circuit connectivity verification packet into aggregated traffic of m packets transmitted over multiple pseudowires in a network path;
    replying from a receiving node of said network to the transmitted m packets with said virtual circuit connectivity verification packet with a packet loss indication when at least one packet loss is detected in an m packet group; and
    adjusting a rate of transmitting the aggregated m packets responsive to the packet loss indication, said adjusting the rate comprising rate adjustment of variable bit rate pseudowires until consecutive virtual circuit connectivity verifications without a packet loss indication occur and comprising adjustment in accordance with $$R_i(n+1) = \frac{T_i(n-1) \times R_i(n) + D_i(n)}{T_i(n) + L},$$

where $T_i(n)$ is round trip time (RTT) of the variable bit rate pseudowire VBR PW i in interval n; $R_i(n)$ is rate of VBR PW i in interval n; $D_i(n)$ is the number of successfully received packets of VBR PW i in interval n; L is the virtual circuit connectivity verification VCCV insertion interval.

2. The method of claim 1, wherein the multiple pseudowires are one of constant bit rate and variable bit rate.

3. The method of claim 1, wherein the step of adjusting the rate comprises rate adjustment of variable bit rate pseudowires.

4. The method of claim 1, wherein the step of adjusting a rate of transmitting the aggregated m packets varies instantaneous changes in round trip time.

5. The method of claim 1, wherein the step of adjusting the rate comprises rate adjustment of variable bit rate pseudowires until k consecutive virtual circuit connectivity verifications without a packet loss indication occur.

6. A method comprising the steps of:
   inserting by a sending node over a network path a virtual circuit connectivity verification packet into aggregated traffic of a number of packets over multiple pseudowires being one of a constant bit rate and a variable bit rate;
   replying to the sending node with said virtual circuit connectivity verification packet with a packet loss indication from a receiving node when at least one packet loss is detected in the number of packets; and
   adjusting a rate of a rate of the variable bit rate pseudowires responsive to the packet loss indication received from the sending node, said step of adjusting the rate comprising rate adjustment of variable bit rate pseudowires until consecutive virtual circuit connectivity verifications without a packet loss indication occur and comprising adjustment in accordance with $$R_i(n+1) = \frac{T_i(n-1) \times R_i(n) + D_i(n)}{T_i(n) + L},$$

where $T_i(n)$ is round trip time (RTT) of the variable bit rate pseudowire VBR PW i in interval n; $R_i(n)$ is rate of VBR PW i in interval n; $D_i(n)$ is the number of successfull received packets of VBR PW i in interval n; L is the virtual circuit connectivity verification VCCV insertion interval.

7. The method of claim 6, wherein the step of adjusting the rate of the number of packets varies with instantaneous changes in round trip time.

8. The method of claim 6, wherein the step of adjusting the rate comprises rate adjustment of variable bit rate pseudowires until k consecutive virtual circuit connectivity verifications without a packet loss indication are received by the sending node.

* * * * *